United States Patent [19]

Liu

[11] Patent Number: 6,154,784
[45] Date of Patent: Nov. 28, 2000

[54] CURRENT MODE ETHERNET TRANSMITTER

[75] Inventor: Edward Liu, Sunnyvale, Calif.

[73] Assignee: LSI Logic Corporation, Milpitas, Calif.

[21] Appl. No.: 09/095,183

[22] Filed: Jun. 10, 1998

[51] Int. Cl.[7] .............................. G06F 15/16; G06F 13/38
[52] U.S. Cl. .................... 709/250; 370/245; 327/540; 327/543; 327/553; 327/563
[58] Field of Search .............................. 709/250; 327/540, 327/543, 553, 563; 375/230; 370/245

[56] References Cited

U.S. PATENT DOCUMENTS

| | | | |
|---|---|---|---|
| 5,357,208 | 10/1994 | Nelson | 330/126 |
| 5,444,414 | 8/1995 | Delano | 327/563 |
| 5,745,479 | 4/1998 | Burns et al. | 370/245 |
| 5,828,476 | 10/1998 | Bonebright et al. | 359/152 |
| 5,880,623 | 3/1999 | Levinson | 327/540 |
| 6,002,717 | 12/1999 | Gaudet | 375/232 |
| 6,003,146 | 12/1999 | Beutler | 714/701 |

OTHER PUBLICATIONS

Khoury, "Design of a 15–MHz CMOS Continuous–Time Filter with On–Chip Tuning", IEEE Journal of Solid State Circuits, pp 1988–1997, Dec. 1991.

*Primary Examiner*—Mark H. Rinehart
*Assistant Examiner*—Ivan C. Pierce, III

[57] ABSTRACT

A transmission system for transmitting a signal from a host to a transmission medium is disclosed. The transmission system includes a current-mode digital-analog converter, an on-chip low-pass filter, a line driver, and output impedance control. Further, a method for transmitting a signal from a host to a transmission medium using on-chip filtering is disclosed. The transmission system and method can be used in transmission of Ethernet signals onto an unshielded twisted pair cable. In addition, with appropriate modification, the transmission system and method can be used for transmitting ATM or other signals onto a transmission medium.

6 Claims, 4 Drawing Sheets

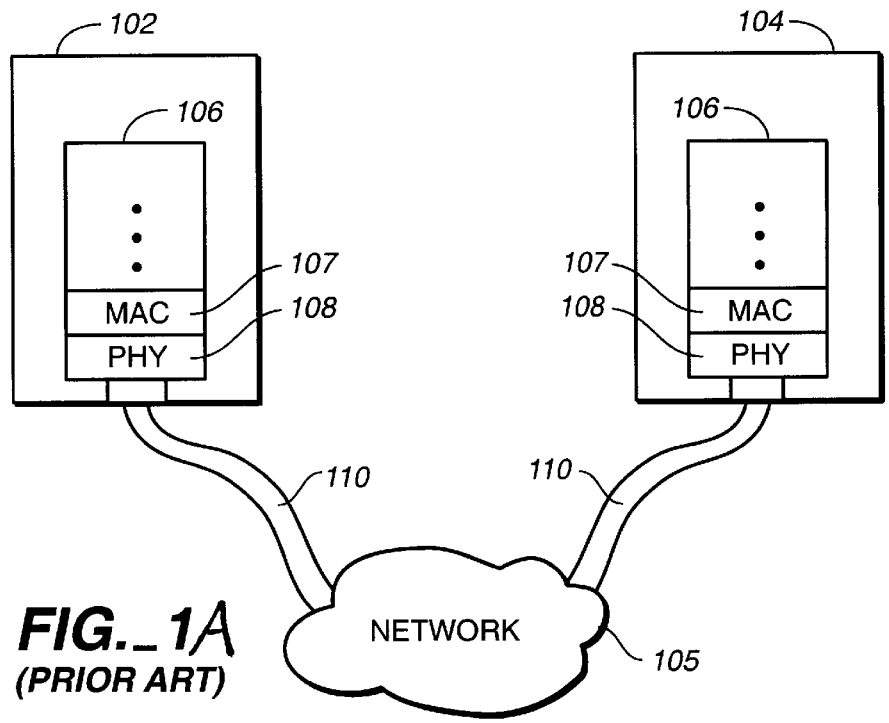
FIG._1A
(PRIOR ART)
| E(n)=A(n-1)' | A(n) | DAC(n) |
|---|---|---|
| 0 | 0 | $-I_{em}$ |
| 0 | 1 | $I$ |
| 1 | 0 | $-I$ |
| 1 | 1 | $I_{em}$ |
FIG._3
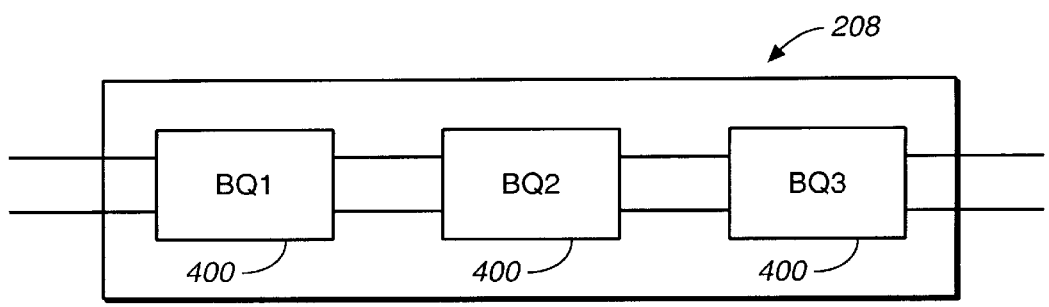
FIG._4

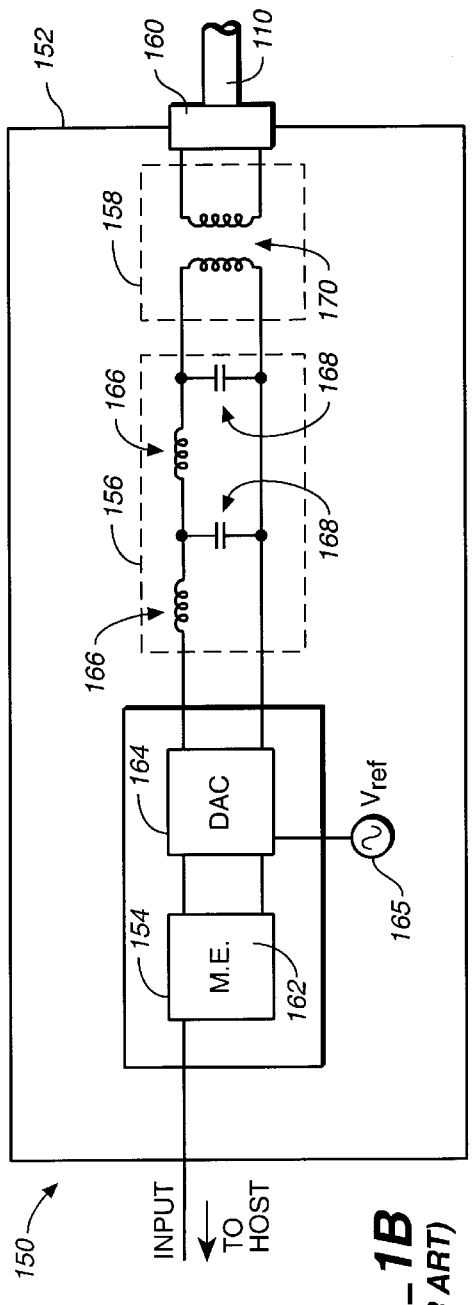
FIG._1B
*(PRIOR ART)*
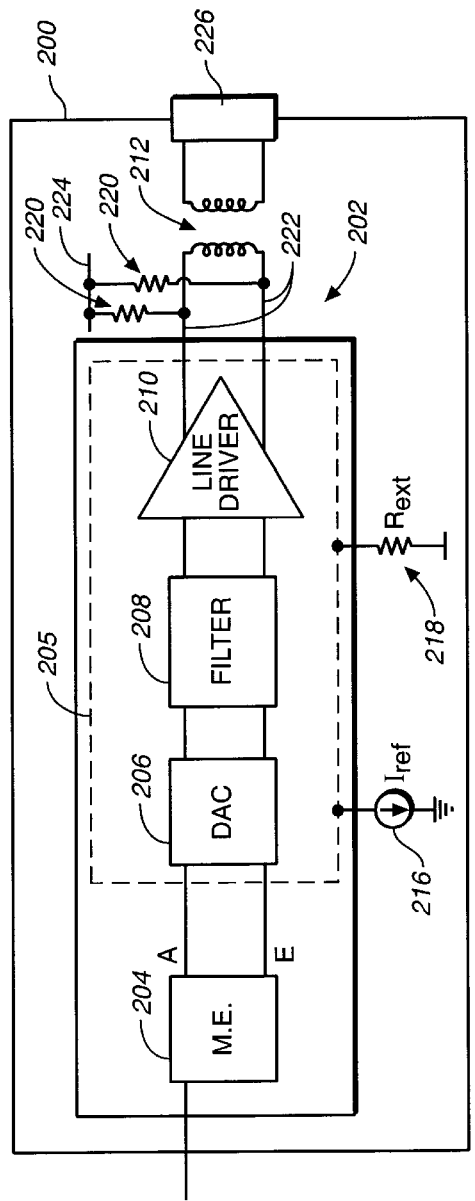
FIG._2

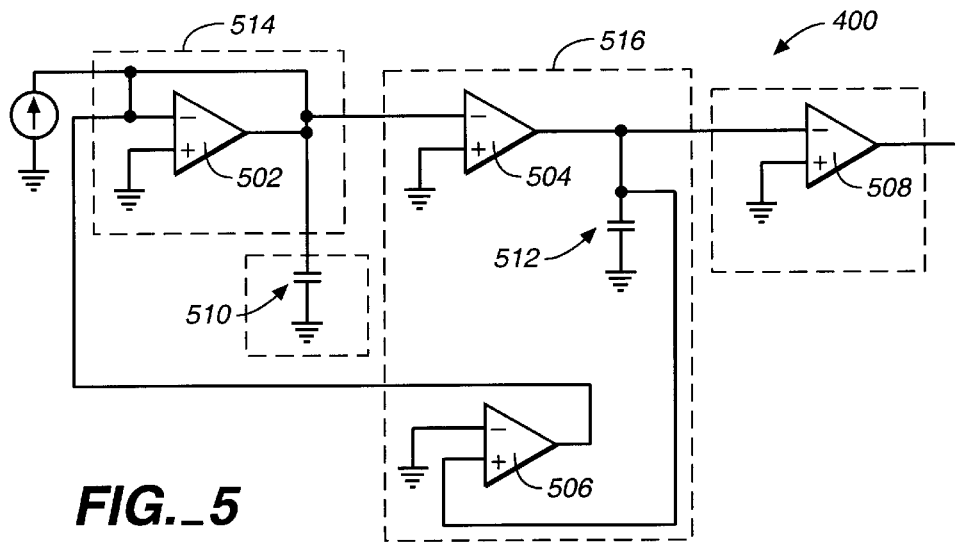
FIG._5
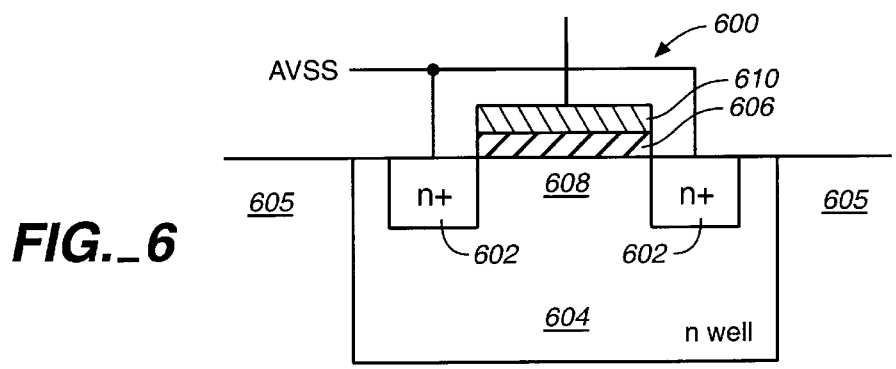
FIG._6
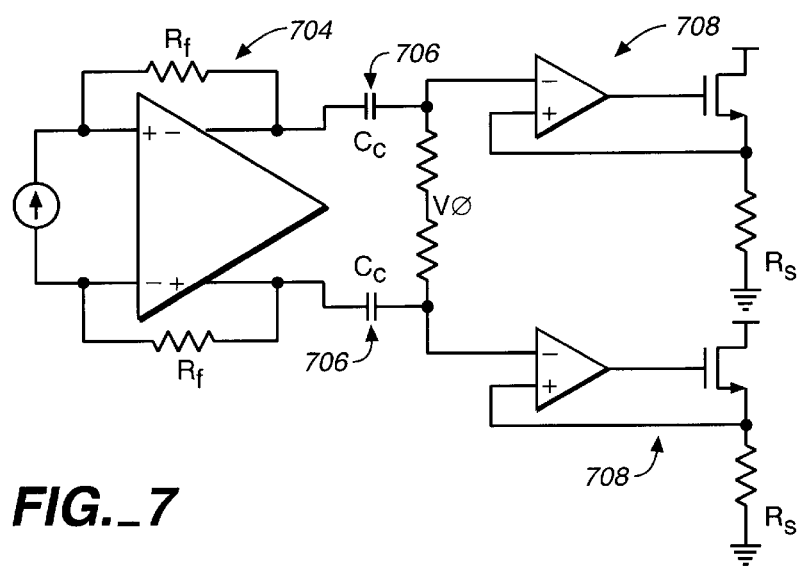
FIG._7

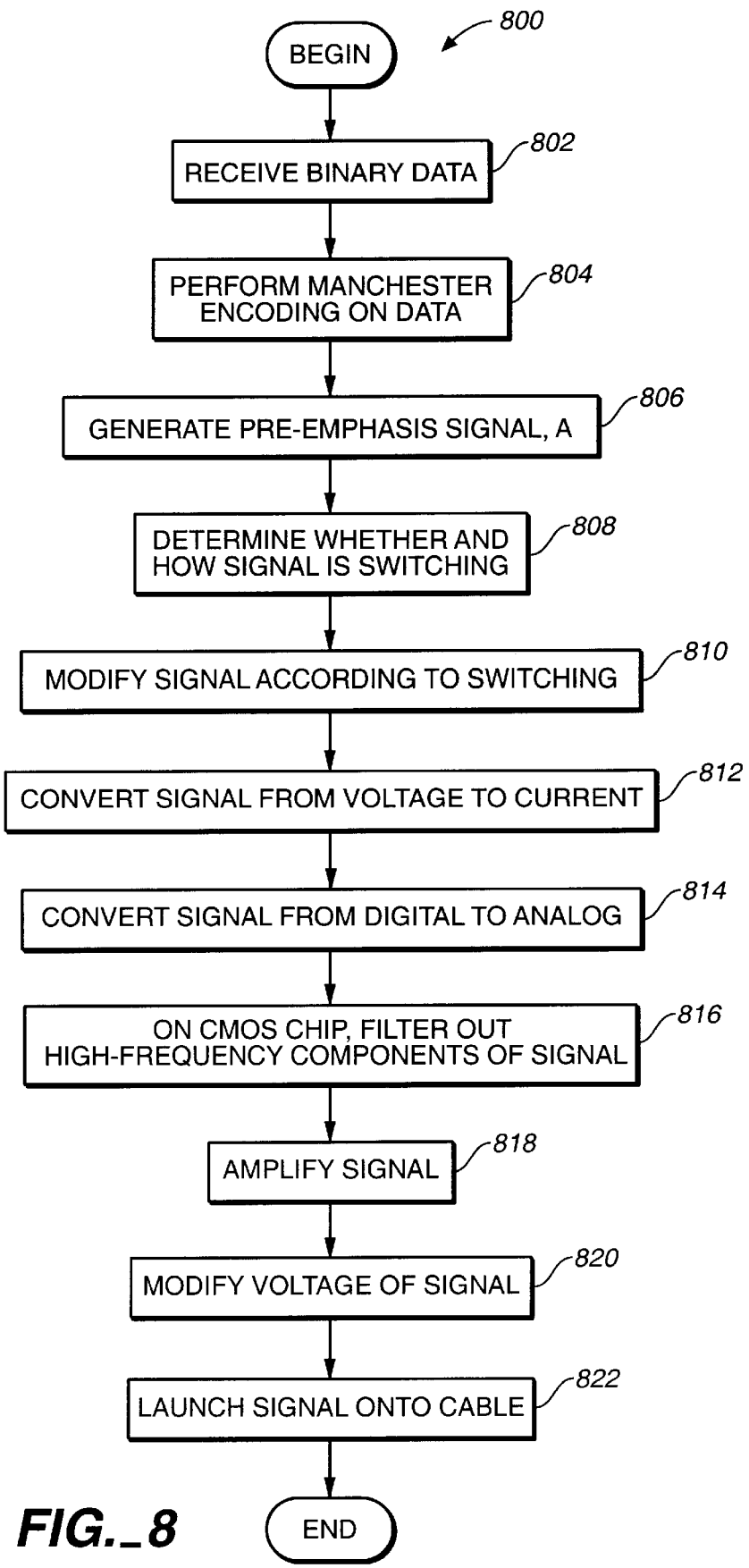
FIG._8

CURRENT MODE ETHERNET TRANSMITTER

CROSS-REFERENCE TO RELATED APPLICATIONS

This application is related to the following U.S. patent application having Ser. Nos. 09/095,180 and 09/095,182 (attorney docket nos. LSI1P138 and LSI1P140), filed on the same day as the instant application, and entitled "Method and Apparatus to Optimize Network Transmitter Performance" and "On-Chip Tuning Method and Apparatus." These applications are hereby incorporated by reference.

BACKGROUND OF THE INVENTION

1. Field of the Invention

The present invention relates generally to computer systems and, more particularly, to an apparatus and method for transmitting signals, such as Ethernet signals, which meet government emission standards, from a computer system to a transmission medium, such as a twisted pair cable.

2. Description of the Related Art

Many computer systems today are utilized in a networked configuration where each networked computer can transmit data to other computers on the same network. Various systems and related protocols have been developed over the years to implement such networks, such as Token Ring, Ethernet, and ATM. Depending upon which network is being used, certain requirements must be met, such as the types of hardware used and particular data characteristics.

The Ethernet local area network (LAN) is one of the most popular and widely used computer networks in the world. Since the beginnings of the Ethernet in the early 1970's, computer networking companies and engineering professionals have continually worked to improve Ethernet product versatility, reliability and transmission speeds. To ensure that new Ethernet products were compatible and reliable, the Institute of Electrical and Electronic Engineers (IEEE) formed a working group to define and promote industry LAN standards. Today, the IEEE has various Ethernet working groups that are responsible for standardizing the development of new Ethernet protocols and products under an internationally well known LAN standard called the "IEEE 802.3 standard."

Currently, there are a wide variety of standard compliant Ethernet products used for receiving, processing and transmitting data over Ethernet networks. By way of example, these networking products are typically integrated into networked computers, network interface cards (NICs), routers, switching hubs, bridges and repeaters. Until recently, common data transmission speeds over Ethernet networks were 10 megabits per second (Mbps). However, to meet the demand for faster data transmission speeds, in May 1995 the IEEE 802.3 standards committee officially introduced another standard, the "IEEE 802.3u standard," for a 100BASE-T system capable of performing data transmissions at up to about 100 Mbps. When operating with unshielded twisted pair (UTP) cable as a transmission medium, these networks are commonly referred to as 10BASE-T and 100BASE-T networks.

FIG. 1A is a diagrammatic representation of two computers 102, 104, which are connected through a network 105. The network 105 can include, for example, other computers, network hubs, network routers, servers or the like. Of course, a single cable connecting the computers 102 and 104 can alternatively be used. Each computer 102 and 104 includes systems to facilitate exchange of information to and from the computer. These systems are diagramatically illustrated by an open systems interconnection (OSI) layered model 106, that was developed by the International Organization for Standards (ISO) for describing the exchange of information between layers. The OSI layered model 106 is particularly useful for separating the technological functions of each layer, and thereby facilitating the modification or update of a given layer without detrimentally impacting the functions of neighboring layers.

Multiple layers (not shown) defined in the OSI model 106 are responsible for various functions, such as providing reliable transmission of data over a network; routing data between nodes in a network; initiating, maintaining and terminating a communication link between users connected to the nodes; performing data transfers within a particular level of service quality; controlling when users are able to transmit and receive data depending on whether the user is capable of full-duplex or half-duplex transmission; translating, converting, compressing and decompressing data being transmitted across a medium; and providing users with suitable interfaces for accessing and connecting to a network. Further, the lower portion of the OSI model 106 includes a media access control layer (MAC) 107 which generally schedules and controls the access of data to a physical layer (PHY) 108.

At a lowermost layer of OSI model 106, PHY layer 108 is responsible for encoding and decoding data into signals that are transmitted across a particular medium, such as a cable 110. To enable transmission to a particular medium, the PHY layer 108 includes a physical connector which is configured and operable to receive the cable 110. Also, the cable 110 can take various forms, including that of an unshielded twisted pair (UTP) cable.

When signals are passed through the cable 110 from the PHY layer 108, the potential exists for portions of the signal to emit from the cable 110 when it is an unshielded type, such as a UTP cable. More specifically, the portions which may emit from the cable typically are high frequency components of the signal. Because such emissions can interfere with other electrical devices in the vicinity of the cable 110, the U.S. government has developed stringent emission standards (commonly known as FCC Class A Requirements) to avoid such interference. To comply with such standards, in the PHY layer the high frequency signal components are typically removed from the primary signal before transmission on the cable 110. As is known in the art, this is commonly referred to as transmit pulse shaping that is followed by reconstruction filtering.

Ethernet transmitters have typically utilized a configuration such as that shown in FIG. 1B to remove high frequency components from the signal before transmission through cable 110. FIG. 1B schematically depicts one PHY application of an Ethernet device, specifically an Ethernet card 150. The Ethernet card 150 includes a PC board 152 on which a transmission system, formed by various components, is mounted. Included in these components is a packaged silicon chip 154, a filter 156, a transformer box 158, and a connector 160.

The packaged silicon chip 154 is configured to convert the input binary data from the host (e.g., a computer into which the Ethernet card 150 is mounted) to a signal that can be transmitted to the cable 110. This typically is accomplished by a data converter such as a Manchester encoder 162 and a digital-to-analog converter (DAC) 164 that is integrated on the packaged silicon chip 154. These devices alternatively can be located on separate semiconductor chips that are each mounted onto the PC board 152.

The Manchester encoder 162 outputs a signal having voltage swings that correspond to the binary data. The DAC 164 then converts the digital signal voltage from the Manchester encoder 162 to an analog signal voltage utilizing a reference voltage, Vref 165. Unfortunately, due to power supply or manufacturing process variations, the reference voltage level that is internally generated can vary by as much as about 20%, which can lead to inaccurate and inconsistent signals. In an Ethernet system, this would result in not matching an "Ethernet eye" template, which is a desired Ethernet transmission characteristic.

Electrically connected to the packaged silicon chip 154, the filter 156 operates to remove the high frequency components from the signal passed from the silicon chip 154. Typically, the filter 156 is formed from discrete components located on the PC board 152, such as inductor components 166 and capacitor components 168 used to form an inductor-capacitor (LC) low pass filter, as shown in FIG. 1B. Because discrete components typically require a substantial amount of PC board 152 area for proper layout and routing, the filter 156 tends to occupy a much larger area on the PC board 152 relative to the space utilized by the Manchester encoder 162 and DAC 164 of the packaged silicon chip 154.

The filtered signal passes from the filter 156 through a transformer 170 in transformer box 158, and then to the connector 160 which is configured to receive the cable 110. Although some typical Ethernet systems use a separate filter and a separate transformer, other systems may be in the form of a single module (not shown), which physically incorporates both the filter 156 and transformer 170.

Unfortunately, typical systems do not adequately control the impedance of the signal transmitted to the cable 110 with on-chip resistors which are subject to fabrication variations. Without adequate impedance control, the output voltage levels, specifically the peak-to-peak voltage level (Vpp), may vary beyond acceptable levels. By way of example, for transmission over differential pair lines, such as a UTP cable, such variation may be undesirable, resulting in poor transmission characteristics.

In addition to the components depicted in FIG. 1B, the PC board 152 typically includes several other components. For example, the PC board 152 may further include a processor, terminal circuitry, wiring, routing, connectors to the host (e.g., a computer system), and other semiconductor chips for performing the functions of other layers of the OSI model 106. Also, many of these components require their own routing and integration elements, which uses more space on the PC board 152. Further, as additional functions and components are developed, more space will be needed on the PC board to accommodate those components.

In addition, the marketplace is driving the development of increasingly smaller computers, requiring corresponding decreases in various computer components. This includes a desire to decrease the size of Ethernet systems, such as Ethernet cards. However, any decrease in size of such systems is limited by the relatively large area necessary for routing and integrating the discrete components of the filter 156.

In view of the foregoing, there is a need for methods and apparatuses for Ethernet signal transmission that will utilize less space than current systems. Further, it is desired to have a method and apparatus that better controls the impedance of the signal that is output to a transmission cable. In addition, it is desirable to have a method and apparatus that responds more robustly to power supply and manufacturing process variations that may cause the internally generated voltages to vary by up to about 20%.

SUMMARY OF THE INVENTION

Broadly speaking, the present invention fills these needs by providing an apparatus and method for current-mode transmission of Ethernet signals onto a cable, with on-chip filtering and output impedance control. It should be appreciated that the present invention can be implemented in numerous ways, including as a process, an apparatus, a system, a device or a method. Several inventive embodiments of the present invention are described below.

In one embodiment, a transmission system for passing a signal, representing data from a computer system, to a transmission cable, includes a filter, integrated on a complementary metal-oxide-semiconductor (CMOS) chip, for removing high frequency components from the signal and passing other components of the signal.

In another embodiment, a process for forming a transmission system for communicating data from a host through a transmission medium includes providing a signal generator to generate a signal that is representative of the data from the host, the signal having high frequency components and other components. The process also includes providing a filter on a complementary metal-oxide-semiconductor chip, such that the filter can operate to remove the high frequency components of the signal while passing the other components of the signal as a filtered signal.

In yet another embodiment, a transmission system for passing an Ethernet signal, representing data from a computer system, to an unshielded twisted pair (UTP) transmission cable includes a manchester encoder adapted to receive binary data from the computer system and to convert the binary data into a primary signal having varying voltage in accordance with the binary data, and for outputting the primary signal, and a complementary metal oxide semiconductor (CMOS) chip. The CMOS chip includes a filter adapted to receive the primary signal and to remove components of the primary signal that have a high frequency, while passing other components of the primary signal. In addition, the filter includes a plurality of cascaded semiconductor devices, each semiconductor device being configured to simulate a functionality of a discrete parallel resistor-inductor-capacitor (RLC) circuit, such that each semiconductor device includes a plurality of transconductance cells and a plurality of capacitors that are electrical interconnected with the plurality of transconductance cells.

In still yet another embodiment, a transmitter for transmitting a signal that represents data from a host, from the host to a transmission medium, such as a cable, includes a manchester encoder configured to convert binary data into a digital voltage signal, and a digital-to-analog converter configured to convert the digital voltage signal into an analog current signal. The transmitter also includes a filter, integrated on a complementary metal-oxide-semiconductor chip, that is configured to remove high frequency components from the analog current signal and to pass other components as a filtered signal. Also, a line driver configured to amplify the filtered signal and to convert the signal from a current to a voltage signal is included, as is a resistor, connected to a voltage source and the line driver, that is configured to modify the voltage signal such that the peak-to-peak voltage is a particular value that is appropriate for the transmission medium that is to be used.

One advantage of the present invention is that less PC board space is used by the Ethernet transmitter. More specifically, because the filter is integrated on-chip, the space typically used by discrete components for the filter is not needed. Thus, the unused space can either be used by additional components on the PC board, or the size of the PC board itself can be reduced. Also, by avoiding the use of discrete components, the cost of the device is correspondingly decreased. In one embodiment of the present invention, the cost of a system is dramatically reduced by integrating the entire transmitter system on-chip, which should be contrasted with the cost of a transmitter system that requires PC board integrated discrete components. In some cases, the total cost of the transmitter system can increase by more than 20 times when discrete components are conventionally used to perform the filtering functions.

An additional advantage of the present invention is that the signal transmission is more robust in response to variations in power supply and manufacturing processes because it operates in current mode. In particular, this results in more consistent transmission signal levels being output to the Ethernet cable, for example. As a further advantage of the present invention, the output impedance is accurately controlled while converting the signal from current to voltage with the proper signal levels, including the proper peak-to-peak voltage (Vpp).

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings. To facilitate this description, like reference numerals designate like structural elements.

FIG. 1A depicts a schematic of two computers connected through a network according to the prior art.

FIG. 1B depicts a schematic of a typical Ethernet transmission system.

FIG. 2 depicts a schematic of an Ethernet transmission system according to one embodiment of the present invention.

FIG. 3 depicts a table correlating the current level generated in accordance with switching of the signal to be transmitted, according to one embodiment of the present invention.

FIG. 4 depicts a schematic of components forming the filter, according to one embodiment of the present invention.

FIG. 5 is a schematic diagram of each biquad forming the filter, according to one embodiment of the present invention.

FIG. 6 depicts a cross-sectional diagram of a CMOS poly-n well capacitor, according to one embodiment of the present invention.

FIG. 7 is a schematic diagram of a line driver, according to one embodiment of the present invention.

FIG. 8 is a flow chart of a method for transmitting data from a host to a transmission medium, according to one embodiment of the present invention.

DETAILED DESCRIPTION OF THE PREFERRED EMBODIMENTS

An invention for transmitting an Ethernet signal including on-chip filtering is disclosed. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

FIG. 2 depicts an Ethernet card 200 incorporating an Ethernet transmission system 202. The Ethernet transmission system 202 includes a Manchester encoder 204 electrically connected to a mixed-signal block 205 and to a transformer 212. The mixed-signal block 205 includes a digital-to-analog converter (DAC) 206, a filter 208, and a line driver 210. Also electrically connected to the mixed signal block 205 are a reference current (Iref) 216, and an external resistor (Rext) 218. In addition, pull-up resistors 220 are connected to lines 222, which connect the line driver 210 and the transformer 212. Resistors 220 are also connected to a rail voltage 224. In addition, to provide physical connection between Ethernet transmission system 202 and a cable (not shown), the Ethernet transmission system 202 includes a connector 226.

The Manchester encoder 204 is configured to receive binary data from a host, such as computer system 102, to which the Ethernet card 200 is coupled. The Manchester encoder 204 can receive binary data at various rates, such as 10 Mbps, which corresponds to a 10BASE-T Ethernet signal. The Manchester encoder 204 is further configured to act as a signal generator, encoding the binary data into a digital signal voltage A (primary signal), which has a voltage that rises and falls in accordance with changes in the binary data.

Because there may be delays in the transmission of the signal at points where the signal is rising or falling, due to the particular electrical properties of the transmission cable, which delay charging and discharging of the cable, it is desired to increase the signal at these points of signal switching. To facilitate this increase, the Manchester encoder 204 is configured to generate a pre-emphasis signal E (secondary signal), which is set to be the inverse of the unit delay of A, for example, $E(n)=A(n)-(1)'$. Using the pre-emphasis signal E and an exclusive NOR gate (not shown) as a signal switch detector, the Ethernet transmission system 202 detects when the signal generated by the Manchester encoder 204 switches between levels. When a switch is detected, the digital-to-analog converter 206 can act as a signal enhancer to obtain the necessary signal level.

The digital-to-analog converter (DAC) 206 of the present invention is a two-bit current-switched device. In addition to converting the signal A from a digital primary signal to an analog primary signal, it is configured to produce a current, I, as a modified primary signal having one of four current levels according to the values of pre-emphasis signal E and signal A. In one embodiment of the present invention, the DAC 206 is formed on a complementary metal-oxide semiconductor (CMOS) chip. Thus, current-mode is used because a precision bandgap reference voltage, necessary for a voltage-output DAC, is not available when a digital CMOS process is used. Also, because power supply and manufacturing process variations may cause variations in internally generated voltages of about up to 20%, the transmission system of one embodiment of the present invention is made more robust by operating in current-mode. Accordingly, the digital-to-analog converter 206 operates in conjunction with the reference current Iref 216, to generate a precise output signal current, the value of which depends upon the values of the pre-emphasis signal E and signal A, as shown in the table of FIG. 3.

Referring to FIG. 3, in the case where E equals zero (0) and A equals zero (0), this indicates a switch in signal A that requires a boost of the signal from −I to −$I_{EM}$. Likewise, where both E and A are one (1), a switch in signal A is indicated and the signal is boosted from I to $I_{EM}$. In contrast, where the values of E and A differ, there is no switching of signal A and, thus, the signal is not boosted from I or −I.

Filter 208 is a low-pass filter that is configured to remove the high frequency components of an input signal while passing other, lower frequency components (e.g., the filtered primary signal). In this embodiment of the present invention, the filter 208 is advantageously integrated on a CMOS chip and formed of a combination of CMOS devices. By forming the filter 208 on-chip, the amount of PC board space occupied by the transmitter is significantly decreased, compared to conventional transmitters that implement discrete component filters. Accordingly, the cost of the transmission system can be reduced by about 95% by using the on-chip filter of the present invention.

FIG. 4 depicts a schematic representation of the filter 208 according to one embodiment of the present invention where filter 208 is a fully differential current-mode Butterworth Gm-C filter. The filter 208 includes three cascaded semiconductor devices (biquads) 400. Each biquad 400 simulates a parallel RLC tank circuit. While three biquads 400 are depicted in FIG. 4, other appropriate multiples of biquads 400 can be used.

A schematic of the constituents of each biquad 400 is shown, in single-ended form for clarity, in FIG. 5. Each biquad includes four identical circuit (but possibly differently sized) transconductance cells (G1–G4) 502, 504, 506 and 508, and two capacitors (C1,C2) 510 and 512. A feedback electrical configuration 514 of the transconductance cell 502 simulates a resistor, while the combination 516 of the transconductance cells 504 and 506 with the capacitor 512, together simulate an inductor. The RLC circuit is completed by the capacitor 510, while the transconductance cell 508 operates as a voltage to current converter.

As shown in FIG. 5, the filter 208 uses only grounded capacitors. When a sub-micron digital CMOS process is used to form filter 208, dual-poly capacitors are not available. Instead, the filter 208 of the current invention utilizes a metal-oxide-semiconductor (MOS) poly-n well capacitor design, such as that schematically depicted in FIG. 6, which operates in accumulation mode. To form the poly-n well capacitor 600, two n+ doped regions 602 are formed in an n well 604, which in turn is formed in a substrate 605, which is coupled to ground. Oxide material is next grown over the n well 604, and a polysilicon layer (i.e., metallization) is deposited over the grown oxide. At this point, the polysilicon layer and oxide are pattered to form a gate oxide layer 606 and a metal gate 610. Once the gate structure is formed, the n+ regions 602 are formed by a suitable dopant implant and temperature anneal process. Thus, the accumulation region 608 is defined in the channel that lies in the n well between the n+ regions 602.

Other intermetal oxide layers and metallization layers may then be deposited and patterned to provide the necessary interconnections to the other elements that form each biquad, as shown in FIG. 5. In particular, the metallization layers preferably electrically connect the metal gate 610 to a positive voltage source during operation of the transmission system 202. Further, the n+ doped regions 602 are connected, through metal contacts that interconnect the metallization layers, to Vss which acts as ground. In response to the positive voltage, electrons from the n+ doped regions 602 accumulate in the accumulation region 608 that lies between the n+ doped regions 602.

As shown in FIG. 2, the signal that is passed by the filter 208 is received by the line driver 210. The line driver 210 is configured to prepare the signal for launch to a cable, such that the signal is optimized for the particular characteristics of the cable being used. FIG. 7 depicts a schematic of a line driver configured to prepare a signal for transmission over an unshielded twisted pair (UTP) cable. The line driver in this embodiment is used to amplify the current that is received from the filter 208 output, to a full scale current level that is more suitable for transmission through a physical medium (e.g., a cable). For example, in one embodiment of the present invention, the line driver 210 is configured to amplify an input signal of about 100 µA that is generated on-chip, to an output signal of about 100 mA. In addition, to avoid introducing distortion during amplification, a class A driver is chosen for its good anti-distortion performance, but of course, a lower power class AB design could also be used. Further, it is desired that the line driver 210 be chosen so as to reject DC offsets from the filter 208 to avoid premature saturation.

Still referring to FIG. 7, the input current is first converted to a voltage through a fully differential, shunt—shunt feedback amplifier 704. Next, the signal voltage is AC coupled through large PMOS transistors that are placed in strong inversion to act as coupling capacitors (Cc) 706. The coupling capacitors 706 serve to overcome DC offset from the filter 208, as well as to provide level shifting from Vdd/2 to V0. Additionally, series-to-series feedback transconductance amplifiers 708 provide voltage-to-current conversion. The amplifiers 708 use the source degeneration, Rs, to sense the output current and to feed the information back to the inverted input. With this feedback, the transconductance "Gm" is set to the inverse of Rs (i.e., Gm≈1/Rs) and, as a result, the overall gain of the design is given by the product of Rf and inverse of Rs (i.e., Gain=Rf * 1/Rs), which is just the ratio of Rf and Rs, independent of resistivity. By way of example, to set this ratio precisely, Rs can be formed by a parallel combination of ten 50 ohm unit resistors, and Rf can be formed by a series combination of the same unit resistors.

Each network system (e.g., Ethernet 10BASE-T or 100BASE-T) may require a particular differential for the voltage output to the transmission medium. For example, Ethernet 10BASE-T requires a peak-to-peak voltage (Vpp) of 5 V. Again referring to FIG. 2, the pull-up resistors 220 and rail voltage 224 are configured to convert the current output from the line driver 210 to a voltage (e.g., voltage-modified primary signal) and to modify the signal to have a Vpp that is appropriate for the transmission medium that is to be used. For example, in one embodiment of the present invention where the current output from line driver 210 is about 100 mA, the rail voltage 224 is 5 V, and the transmission cable is a UTP cable, 50 ohm resistors are used to output a signal with a Vpp of 5 V. Of course, in other embodiments other values can be used to accommodate other types of transmission media and network systems.

In addition, the transmission system further includes a transformer 212 through which the signal passes. It should be noted that, because the filtering is performed on-chip, a relatively inexpensive transformer-only module (not including an external filter) is used. After the transformer, the signal is finally launched onto the cable 110 through the connector 226.

FIG. 8 depicts a transmission method 800 for transmitting a signal from a host, such as a computer system, to a transmission medium, such as a UTP cable. In operation 802, binary data is received from the computer system. The receiving of the binary data can occur at various speeds, for example, at 10 Mbps. Next, in operation 804, the binary data is Manchester encoded to produce signal A. As is well known by those of skill in the art, Manchester encoding involves the conversion of binary data into a digital voltage signal, with voltage varying in accordance with variations in the binary data.

In addition to the Manchester encoding performed in operation 804, a pre-emphasis signal E is generated in operation 806. This pre-emphasis signal is set to be the inverse of the unit delay of signal A. By using the signal generated by the Manchester encoding in operation 804 along with the pre-emphasis signal E that is generated in operation 806, it is determined whether and how the Manchester encoded signal is switching in operation 808. In particular, it is determined when the signal is rising and when it is falling. To avoid potential transmission delays, in operation 810 the signal is modified according to the signal switching. In the present invention, this modification of the signal is an increase in the signal strength sufficient to overcome the delays which would be caused by the electrical characteristics of the transmission cable.

To facilitate current-mode operation of the transmission method 800, the signal is converted from a voltage to a current in operation 812. In operation 814, the signal is also converted from a digital signal to an analog signal. After the digital-to-analog conversion, the high frequency components of the signal are filtered out on a CMOS chip, while the other components of the signal are passed, in operation 816. Next, the portions of the signal that are passed are amplified in operation 818 after which the voltage of the signal is modified in operation 820. This voltage modification is performed to prepare the signal for transmission and to conform with an optimal peak-to-peak voltage (Vpp) associated with the transmission cable to be used. For example, some UTP cables require a Vpp of 5 V for optimal performance, and thus when such cables are used the signal can be modified to have a Vpp of 5 V. Finally, in operation 822, the signal is launched onto the transmission medium.

The Manchester encoder 204, DAC 206, filter 208, and line driver 210 may each be formed on separate CMOS chips. Alternatively, however, other combinations of these devices can be located on a single chip or a single module that can be individually connected or removed from the PC board. For example, the DAC 206, filter 208, and line driver 210 can be formed in a single module, while the Manchester encoder is formed in a separate module on the same IC chip.

Although one embodiment of the present invention is configured to transmit 10BASE-T Ethernet signals, the transmission system of the present invention can be used to transmit Ethernet signals at other speeds, with appropriate modification of the above described components. Also, the present invention can be configured to transmit other types of signals, such as ATM signals, by making appropriate modifications to the components of the present invention.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A transmission system for passing a signal, representing data from a computer system, to a transmission cable, the transmission system comprising:

a filter integrated on a complementary metal-oxide-semiconductor (CMOS) chip, for removing high frequency components from the signal and passing other components of the signal, the filter being configured to receive the signal representing data from the computer system and configured to output a filtered signal to the transmission cable;

wherein the filter comprises:

a plurality of cascaded semiconductor devices, each semiconductor device being configured to simulate a functionality of a discrete parallel resistor-inductor-capacitor (RLC) circuit, each semiconductor device comprising:

a plurality of transconductance cells; and a plurality of capacitors in electrical connection with the plurality of transconductance cells;

wherein each capacitors is a capacitor operating in accumulation mode, the capacitor comprising:

a well doped with a first dopant type at a first concentration, the well located in a substrate of the CMOS chip;

two doped regions doped with first dopant type at a second concentration, the second concentration greater than the first concentration, the doped regions located within the well and separated by an accumulation region of the well;

a gate oxide layer overlying the accumulation region of the well between the two doped regions;

a metal layer overlying the gate oxide; and a metallization layer configured to provide electrical connection between the doped regions and a ground, and between the metal layer and a voltage source, such that a capacitance is formed between the accumulation region and the metal layer by applying a voltage to the metal layer.

2. A process for forming a transmission system for communicating data from a host through a transmission medium, the process comprising:

providing a signal generator to generate a signal that is representative of the data from the host, the signal having high frequency components and other components; and providing a filter on a complementary metal-oxide-semiconductor chip, such that the filter can operate to remove the high frequency components of the signal while passing the other components of the signal as a filtered signal;

wherein the step of providing a filter comprises the steps of:

providing a plurality of transconductance cells; and providing a plurality of capacitors electrically connected with the plurality of transconductance cells, such that the electrical configuration of the transconductance cells and capacitors result in electrical operation as a particular combination of resistances, inductances and capacitances;

wherein the step of providing the plurality of capacitors comprises the steps of:

providing a substrate;

providing a well near a surface of the substrate, the well doped with a first dopant type at first concentration of, the well;

providing two doped regions within the well, such that an accumulation region of the well lies between the doped regions, the doped regions being configured to be electrically connected to a ground, the doped regions doped with the first dopant type at a second concentration, the second concentration greater than the first concentration;

providing an oxide layer above the accumulation region; and providing a metal layer above the oxide layer, the metal layer being configured to be subjected to a voltage, such that when the metal layer is subjected to a positive voltage and the n+ doped regions are electrically connected to ground, a capacitance is formed between the accumulation region and the metal layer.

3. A transmission system for passing an Ethernet signal, representing data from a computer system, to an unshielded twisted pair (UTP) transmission cable, the transmission system comprising:

a manchester encoder adapted to receive binary data from the computer system and to convert the binary data into a primary signal having varying voltage in accordance with the binary data, and for outputting the primary signal; and a complementary metal oxide semiconductor (CMOS) chip comprising, a filter adapted to receive the primary signal and to remove components of the primary signal that have a high frequency, while passing other components of the primary signal, the filter including a plurality of cascaded semiconductor devices, each semiconductor device being configured to simulate a functionality of a discrete parallel resistor-inductor-capacitor (RLC) circuit, such that each semiconductor device includes a plurality of transconductance cells and a plurality of capacitors that are electrically interconnected with the plurality of transconductance cells;

wherein each capacitor is an n-channel transistor operating in accumulation mode.

4. A transmission system as recited in claim 3, wherein the n-channel transistor further comprises:

an n well located in a substrate of the CMOS chip;

two n+ doped regions located within the n well and separated by an accumulation region of the n well;

a gate oxide layer overlying the accumulation region of the n well between the two n+ doped regions;

a metal layer overlying the gate oxide; and a metallization layer configured to provide electrical connection between the n+ doped regions and a ground, and between the metal layer and a voltage source, such that a capacitance is formed between the accumulation region and the metal layer by applying a voltage to the metal layer.

5. A transmission system as recited in claim 1 wherein the well is an n well and the doped regions are n+ doped regions.

6. The process as recited in claim 2 wherein the well is an n well and the doped regions are n+ doped regions.

* * * * *